(12) United States Patent
Kang et al.

(10) Patent No.: US 10,771,342 B2
(45) Date of Patent: Sep. 8, 2020

(54) ENCODING AND VERIFYING NETWORK INTENTS FOR STATEFUL NETWORKS

(71) Applicant: Hewlett Packard Enterprise Development LP, Houston, TX (US)

(72) Inventors: Joon-Myung Kang, San Jose, CA (US); Huazhe Wang, Palo Alto, CA (US); Puneet Sharma, Palo Alto, CA (US)

(73) Assignee: Hewlett Packard Enterprises Development LP, Houston, TX (US)

( * ) Notice: Subject to any disclaimer, the term of this patent is extended or adjusted under 35 U.S.C. 154(b) by 129 days.

(21) Appl. No.: 16/176,905

(22) Filed: Oct. 31, 2018

(65) Prior Publication Data

US 2020/0136917 A1 Apr. 30, 2020

(51) Int. Cl.
*H04L 29/06* (2006.01)
*H04L 12/24* (2006.01)
*H04L 29/12* (2006.01)

(52) U.S. Cl.
CPC .......... *H04L 41/12* (2013.01); *H04L 61/2567* (2013.01); *H04L 61/2571* (2013.01); *H04L 61/2575* (2013.01); *H04L 63/0281* (2013.01)

(58) Field of Classification Search
None
See application file for complete search history.

(56) References Cited

U.S. PATENT DOCUMENTS 9,787,572 B2 10/2017 Voit et al.
9,806,991 B2 10/2017 Lucas et al.
2002/0178246 A1 11/2002 Mayer
2014/0369209 A1 12/2014 Khurshid et al.
2018/0077061 A1 3/2018 Horn et al.
2018/0124008 A1 5/2018 Tackabury
2018/0351822 A1* 12/2018 Mohanram ........... H04L 41/145
2018/0367417 A1* 12/2018 Dixit ................... H04L 41/0866
2019/0007453 A1 1/2019 Nimmagadda et al.

(Continued)

OTHER PUBLICATIONS

Zhou et al., "Enforcing Customizable Consistency Properties in Software-Defined Networks", 12th USENIX Symposium on Networked Systems Design and Implementation (NSDI '15), 2015, pp. 73-85.

(Continued)

*Primary Examiner* — Andrew J Steinle
(74) *Attorney, Agent, or Firm* — Hewlett Packard Enterprise Patent Development

(57) ABSTRACT

Example method includes: identifying three relationships about a network function in an intent-based stateful network—(1) the network function forwarding a network packet implies that at least one previous network packet was received by the network function in the same direction prior to the network packet is forwarded, (2) an established state in the network function implies that at least one previous network packet was received at the network function, (3) the network function receiving the network packet as a downward network function implies the network packet was previously sent by a second network function acting as an upward network function; encoding the network function using a combination of at least one of the three identified relationships; and verifying a plurality of network intents in the intent-based stateful network based at least in part on the encoding of the network function.

20 Claims, 7 Drawing Sheets

(56) References Cited

U.S. PATENT DOCUMENTS

| 2019/0166013 | A1 | 5/2019 | Shaikh et al. |
| 2019/0182119 | A1* | 6/2019 | Ratkovic ............. G06F 16/2379 |
| 2019/0238410 | A1 | 8/2019 | Kang et al. |

OTHER PUBLICATIONS

Stoenescu et al., "Symnet: Scalable symbolic execution for modern networks", SIGCOMM '16, Aug. 22-26, 2016, 14 pages.

Panda et al., "Verifying Reachability in Networks with Mutable Datapaths", 14th USENIX Symposium on Networked Systems Design and Implementation, 2017, pp. 699-718.

Khurshid et al., "VeriFlow: Verifying Network-Wide Invariants in Real Time", 10th USENIX Symposium on Networked Systems Design and Implementation (NSDI '13), 2013, pp. 15-27.

Kazemian et al., "Header Space Analysis: Static Checking for Networks", Proceedings of the 9th USENIX conference on Networked Systems Design and Implementation, 2012, 14 pages.

Bakhshi et al, Towards Dynamic Network Policy Composition and Conflict Resolution in Software Defined Networking, IEEE Spectrum, Dec. 30-31, 2017, 4 Pgs, https://ieeexplore.ieee.org/document/8320162/.

Classifying Network Traffic Using NBAR, Cisco, Mar. 14, 2018, 38 Pgs. https://www.cisco.com/c/en/us/td/docs/ios-xml/ios/qos_nbar/configuration/xe-16-6/qos-nbar-xe-16-6-book/clsfy-traffic-nbar.pdf.

Intent-based Networking Building the bridge between business and IT, Cisco, 2017, 11 Pgs. https://www.cisco.com/c/dam/en/us/solutions/collateral/enterprise-networks/digital-network-architecture/nb-09-intent-networking-wp-cte-en.pdf.

Kazemian et al, Real Time Network Policy Checking Using Header Space Analysis, 10th USENIX Symposium on Networked Systems Design and Implementation (NSDI'13), Mar. 9, 2013, 13 Pgs.

The eight most common use cases for the Forward Platform, Forward Networks, Mar. 15, 2018. 14 Pgs. https://www.forwardnetworks.com/wp-content/uploads/2018/03/Use-Case-White-paper-1.pdf.

Valenza et al, A Formal Approach for Network Security Policy Validation, Mar. 2017, 22 Pgs. http://isyou.info/jowua/papers/jowua-v8n1-4.pdf.

Yuan et al, NetSMC: A Symbolic Model Checker for Stateful Network Verification, Feb. 14, 2018, 24 Pgs. https://www.andrew.cmu.edu/user/yifeiy2/publication/netsmc.pdf >.

Beckett et al., "A general approach to network configuration verification", Proceedings of the Conference of the ACM Special Interest Group on Data Communication, pp. 155-168.

Malik et al., "Boolean satisfiability from theoretical hardness to practical success", Communications of the ACM—A Blind Person's Interaction with Technology, vol. 52, Issue 8, Aug. 2009, pp. 76-82.

Moura et al., "Satisfiability modulo theories: introduction and applications", Communications of the ACM, vol. 54, Issue 9, Sep. 2011, pp. 69-77.

* cited by examiner

300

```
Forall [i₀, p, t₀] send(fw, i₀, p, t₀) Implies
Exists [i₁, t₁] recv(fw, i₁, p, t₁) ^ t₁ < t₀ ^ i₀ ≠ i₁

Forall [i₀, p₀, t₀]
Send(fw, i₀, p₀, t₀) ^ ¬ acl_func(p₀.src, p₀.dst) Implies
Exists [i₁, p₁, t₁] recv(fw, i₁, p₁, t₁) ^ t₁ < t₀ ^ i₀ ≠ i₁ ^
acl_func(p₁.src, p₁.dst) ^ p₁ == p₀.reverse
```

```
Forall [p₀, t₀] send(lb, 1, p₀, t₀) Implies
Exists [p₁, t₁] recv(lb, 0, p₁, t₁) ^ t₁ < t₀ ^ share_addr(p₁.dst)
^ p₁.src == p₀.src Forall [p₀, t₀] send(lb, 0, p₀, t₀) Implies
Exists [p₁, p₂, t₁, t₂] recv(lb, 1, p₁, t₁) ^ recv(lb, 0, p₂, t₂)
^ t₂ < t₁ < t₀ ^ p₂ == p₀.reverse ^ share_addr(p₂.dst) ^
server_addr(p₁.src) ^ p₀.dst == p₁.dst == p₂.src
```

```
Forall [p₀, t₀] send(nat, 1, p₀, t₀) Implies
Exists [p₁, t₁] recv(nat, 0, p₁, t₁) ^ t₁ < t₀ ^ pub_addr(p₀.src)
^ p₁.dst == p₀.dst Forall [p₀, t₀]
Send(nat, 0, p₀, t₀) Implies
Exists [p₁, p₂, t₁, t₂] recv(nat, 1, p₁, t₁) ^ recv(nat,0, p₂, t₂)
^ t₂ < t₁ < t₀ ^ p₂ .reverse ^ pub_addr(p₁.dst) ^ p₀.src == p₁.src
```

```
Forall [p₀, t₀] send(py, 1, p₀, t₀) Implies
Exists [p₁, t₁] recv(py, 0, p₁, t₁) ^ t₁ < t₀ ^ p₀.src == py ^
acl_func(p₁.src, p₁.dst) ^ p₀.payload == p₁.payload Forall [p₀, t₀] send(py, 0, p₀, t₀) Implies
Exists [p₁, p₂, t₁, t₂] recv(py, 1, p₁, t₁) ^ recv(py, 0, p₂, t₂)
^ t₂ < t₁ < t₀ ^ acl_func(p₂.src, p₂.dst) ^ acl_func(p₀.dst,
p₀.src) ^ p₁.dst == py ^ p₀.src == p₁.src ==p₂.dst ^ p₀.payload
== p₁.payload == p₂.payload
```

*FIG. 3D*

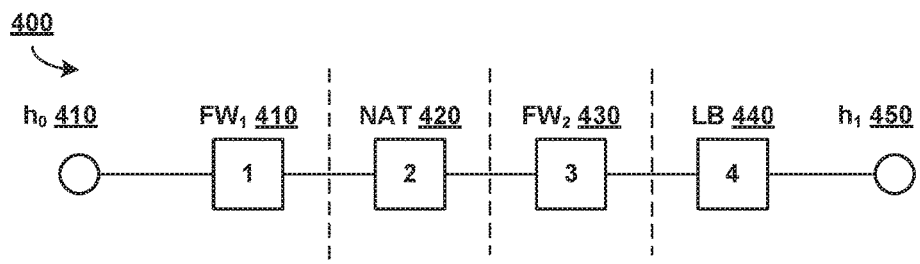
*FIG. 4A*
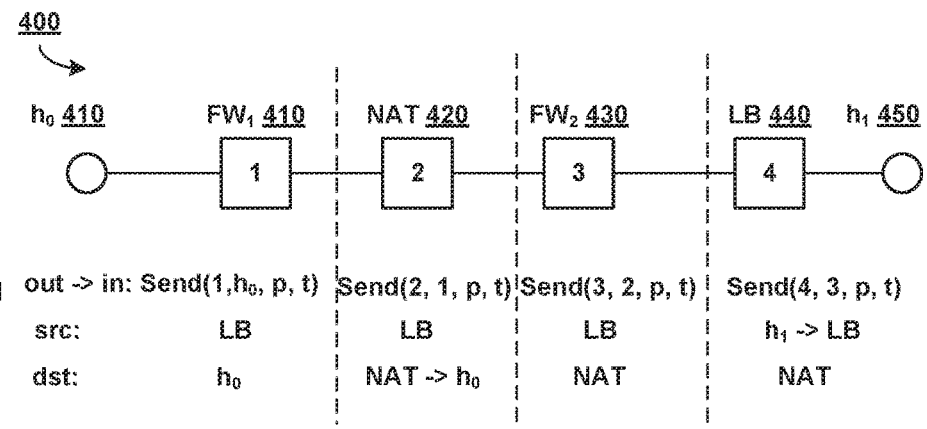
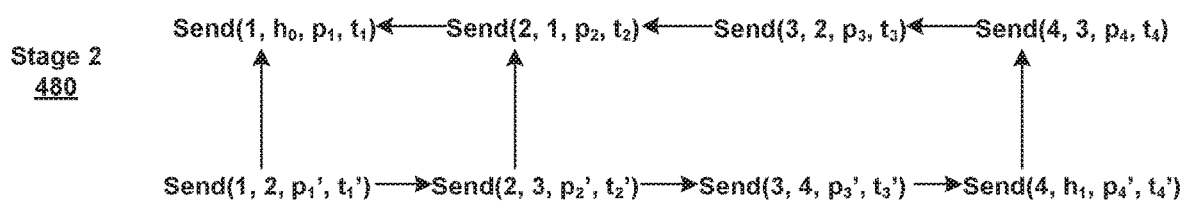
*FIG. 4B*

ENCODING AND VERIFYING NETWORK INTENTS FOR STATEFUL NETWORKS

BACKGROUND

Network intents generally refer to high level objectives of a network. One example of the network intents may be the reachability, which implies that one endpoint in an intent-based network should be able to access another endpoint in the intent-based network. In a stateful network, network functions conduct stateful behaviors rather than static behaviors. Therefore, the processing of network packets in a stateful network is not limited to the processing of the packet headers and packet payloads. Rather, the processing of the network packets may also be based on packet history that a network device including an endpoint observed in the past.

BRIEF DESCRIPTION OF THE DRAWINGS

The following detailed description references the drawings, wherein:

FIGS. 3A-3D show how to capture causal precedence relationships using example SMT encodings according to the present disclosure;

FIGS. 4A-4B illustrates an example two-stage verification of network functions in stateful intent-based networks;

DETAILED DESCRIPTION

Misconfigured network functions can result in network policies being violated, e.g., allowing untrusted hosts to access confidential data. Network verification tools, such as Veriflow and Header-Space Analysis (HSA), are increasingly used to avoid misconfiguration and verify that configurations are in accordance with intended policies. These tools assume that the network data plane is stateless and implements a limited set of actions. Neither assumption holds for networks with stateful network functions and devices. As a result, these tools cannot be extended to verify correctness when network functions (or middleboxes) are used.

Figure 1A:
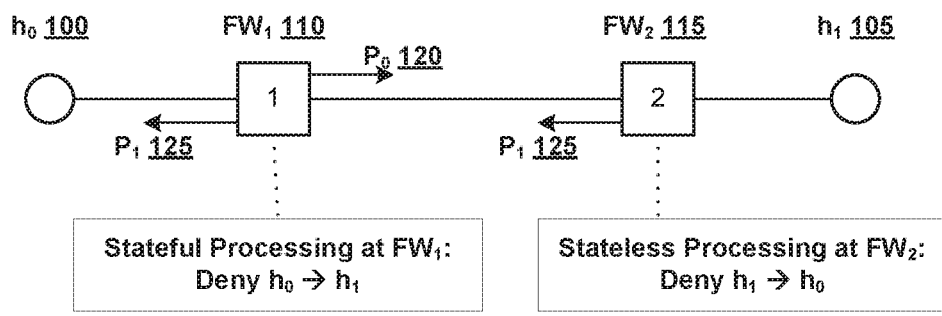
FIGS. 1A-1B illustrate example intent-based stateful networks in accordance with the present disclosure.
Figure 1B:
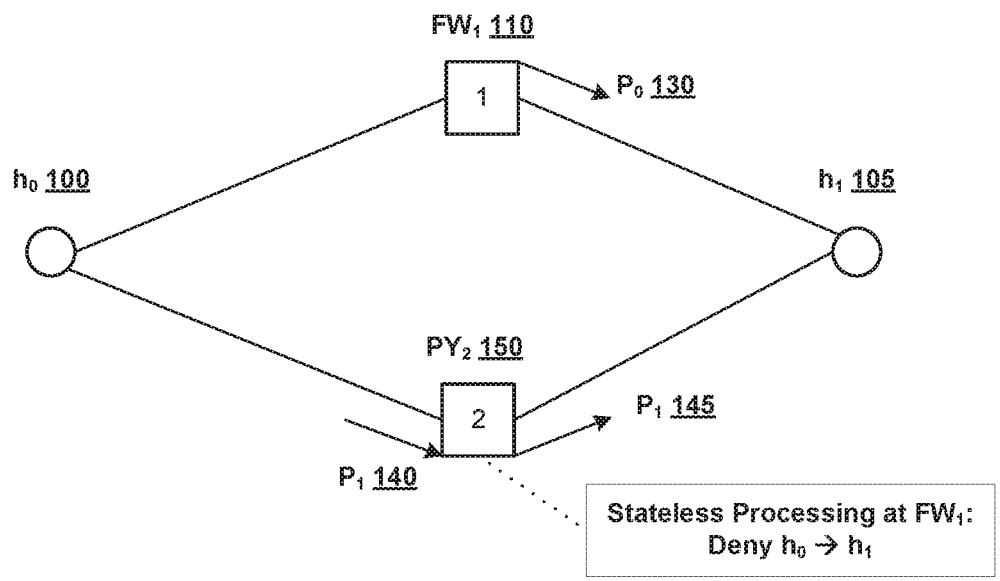

FIGS. 1A-1B illustrate example intent-based stateful networks in accordance with the present disclosure. Network intents are high-level network operating objectives. They may define how a traffic class should be forwarded, which network functions should be traversed. A "traffic class" refers to a group of sources and destinations. Network functions generally are security appliances (such as, firewalls, intrusion detection system, etc.), or performance appliances (such as, load balancer, caches, etc.). An example network intent policy may be, for example, hosts from a guest subnet should be able to reach subnet servers by going through a firewall and a load balancer (FW→LB). To make the intent specification more expressible, examples of the disclosed system may use regular expressions to specify packet processing requirements. For example, the regular expressions may specify that the matching packets should not go through certain network functions, or the packets should go through two continuous network functions without being redirected to other devices, etc.

Specifically, FIG. 1A illustrates stateful processing of network packets between two hosts $h_0$ 100 and $h_1$ 105. In this example, the two hosts $h_0$ 100 and $h_1$ 105 are connected through two firewalls $FW_1$ 110 and $FW_2$ 115. Assuming that two rules are configured for the firewalls: First, at firewall $FW_1$ 110, packets from host $h_0$ 100 to host $h_1$ 105 are denied. Second, packets from host $h_1$ 105 to host $h_0$ 100 are denied at firewall $FW_2$ 115. As a stateful firewall will allow incoming packets that belong to an established state, a packet $P_0$ 120 may still be able to pass through firewall $FW_1$ 110, for example, when there exist a previous reverse packet $P_1$ 125. However, to reach $FW_1$ 110, $P_1$ 125 should pass through $FW_2$ 115 first. This would be in conflict with the deny rule at $FW_2$ 115. In this example, when the previous reverse packet $P_1$ 125 is received at the stateful firewall $FW_1$ 110, the stateful firewall is set in an established state. Subsequently, when the packet $P_0$ 120 is received at firewall $FW_1$ 110 that is in an established state, the packet $P_0$ 120 will be allowed. In general, a state as referred here to can represent any type of information that a stateful firewall can extract from historical packet processing. In some examples, the forwarding decision made by a stateful firewall can be whether the state value is greater or less than a threshold value. In some examples, the forwarding decision made by a stateful firewall can be whether the state value equals a value corresponding to a particular state (e.g., 0 or 1). Therefore, in a stateful intent-based network, packet behaviors at a stateful network function are not only decided based on the incoming packet characteristics, but also based on previous packet processing history as well as related packet processing at other network functions.

As used herein, "network functions" may employ a variety of actions. Such network functions may be virtualized network functions that are responsible for handling specific network functions that run on virtual machines over the hardware networking infrastructure (such as, routers, switches, servers, cloud computing systems, etc.). For example, network address translation (NAT) may be a network function that can remap one Internet Protocol (IP) address space into another by modifying network address information in IP datagram packet headers while they are transmitted across the network. Moreover, a load balancer may be a network function that can modify packet headers based on their configurations to distribute workloads across multiple computing resources, thereby achieving improved resource use, maximize throughput, minimize response time, and avoiding overload of any single network resource. In addition, a proxy may be a network function that works as an intermediate n between a client and a server, which terminates a request packet from the client and initiates a new packet to the server.

The dynamics in network function packet processing make it more complicated to determine packet behavior. For example, in FIG. 1B, there are two possible paths between host $h_0$ 100 and $h_1$ 105. Because of the rules configured at firewall $FW_1$ 110, packets that are directly sent from host $h_0$ 100 to $h_1$ 105 (e.g., $P_0$ 130) may be dropped at the intermediate firewall $FW_1$ 110. However, host $h_0$ 100 can access host $h_1$ 105 by using the proxy $PY_2$ 150 according to this example.

Figure 2A:
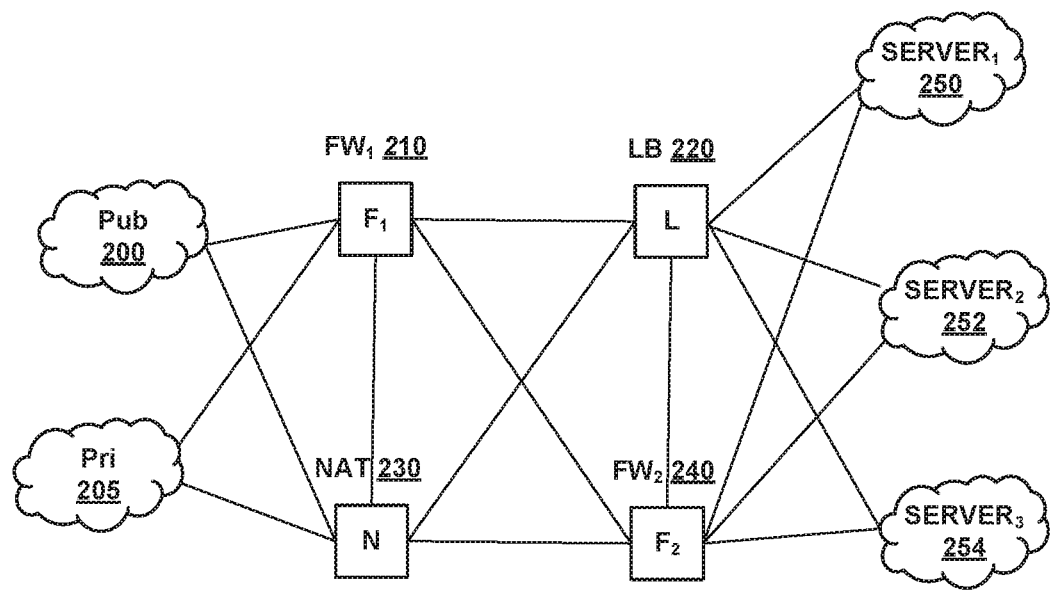
FIGS. 2A-2B illustrate example network graph and path identification according to examples of the present disclosure.
Figure 2B:
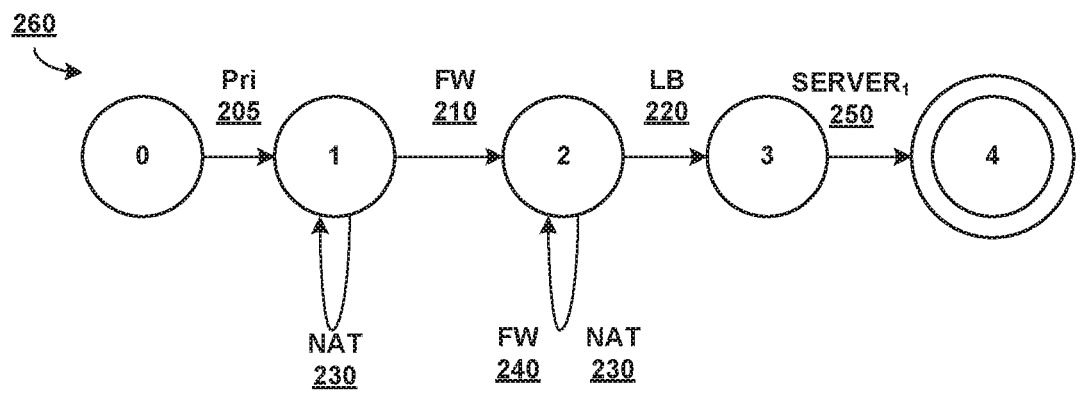

FIGS. 2A-2B illustrate example network graph and path identification according to examples of the present disclosure. A network graph may generally refer to an abstracted graph extracted from network topology. Nodes in a network graph may represent subnets or network functions. Edges in a network graph may represent physical links that connect the end hosts and network functions. FIG. 2A shows an example network graph with five subnets and four network functions. The five subnets include a public network (Pub) 200, a private network (Pri) 205, a subnet including Servers$_1$ 250, a subnet including Servers$_2$ 252, and a subnet including Servers$_3$ 254. In addition, the four network functions include a first firewall FW$_1$ 210, a load balancer LB 220, a network address translator NAT 230, and a second firewall FW$_2$ 240. In this example, Pub 200 and Pri 205 each is connected to network functions firewall FW$_1$ 210 and network address translator NAT 230. The firewall FW$_1$ 210 network function may precede the load balancer LB 220, the network address translator NAT 230, and/or the firewall FW$_2$ 240. Similarly, the network address translator NAT 230 may precede the firewall FW$_1$ 210, the load balancer LB 220, and/or the firewall FW$_2$ 240. The network function load balancer LB 220 may precede the firewall FW$_2$ 240, and vice versa. Finally, upon being processed through the aforementioned four network functions, packets from subnets Pub 200 and Pri 205 are transmitted to one or more of subnets including Server$_1$ 250, Server$_2$ 252, Server$_3$ 254, etc.

FIG. 2B illustrates an example policy automation according to examples of the present disclosure. A policy automaton may be converted from the regular expression representation of network intent policies. For example, a network policy manager may allow a network administrator to specify a plurality of network rules and/or policies. The network rules and/or policies are then translated into configurations for the network devices in a network. Examples of the present disclosure allows for verification and/or determination of whether the translation from the rules and/or policies configured at the policy manager for an intent-based stateful network into the configurations at the network devices in the intent-based stateful network are correct. In particular, the example system retrieves information about rules and policies configured in an intent-based stateful network, retrieves configuration information from network devices in the intent-based stateful network, and determine how the network devices are interconnected within the intent-based stateful network. Then, the example system can determine whether the rules and/or policies are correctly translated into the configurations based on the retrieved information.

Such policy automation may specify the packet processing specifications for a particular traffic class. The example policy 260 illustrated in FIG. 2B indicates that according to a policy 260 configured in an intent-based stateful network, packets from the private subnet Pri 205 should be able to reach subnet Servers$_1$ 250 by going through a firewall (e.g., FW 210 and/or 240) and a load balancer (e.g., LB 220).

Next, given the network graph and the policy automata, the example system may compact representation that describes all the possible paths that a packet can go through the network subject to the policy and topology constraints. Specifically, the example system can obtain a product graph by intersecting the policy automata with the network graph. Such product graph may be constructed by adding an edge from a node m to n if (1) mn is an edge in the network graph, and (2) the transition from m to n represents a valid state transition in the policy automata. In the example shown in FIG. 2A, the path from private subnet Pri 205 to firewall FW$_1$ 210 to load balancer LB 220 to Servers$_1$ 250 represents one valid path in the network graph that satisfies the policy requirement.

Likewise, the path from private subnet Pri 205 to NAT 230 to FW$_1$ 210 to to LB 220 to Server$_1$ 250 represents another valid path in the network graph that satisfies the policy requirement. This path is represented in FIG. 2B by adding an edge from state 1 to itself, indicating that the packet from private subnet Pri 205 may go through network address translator NAT 230 before going through firewall FW 210.

Furthermore, the path from private subnet Pri 205 to FW$_1$ 210 to NAT 230 (or FW$_2$ 240) to LB 220 to Server$_1$ 250 represents another valid path in the network graph that satisfies the policy requirement. This path is represented in FIG. 2B by adding an edge from state 2 to itself, indicating that the packet from private subnet Pri 205 may go through network address translator NAT 230 (or FW$_2$ 240) after going through firewall FW$_1$ 210 and before going through LB 220.

The functionality of a network function can be factored into two generic parts: (1) a classifier that searches for matching over certain packet header fields or payload, and (2) a transfer function that transforms incoming and outgoing packets. Upon receiving a packet, based on configurations, a network function processes the packet with the actions corresponding to the rules or states that the packet matches. Note that the input packet on which an output depends shall be received before the output is produced. In other words, there exists a causal precedence relationship between the input and output. We can generically express this relationship as recv$_{p1}$→send$_{p2}$, where [A]→[B] denotes that event B depends on A. Here, $p_1$ and $p_2$ correspond to the same packet before and after network function processing. Both $p_1$ and $p_2$ may be subject to certain constraints determined by network function configurations, e.g., for a firewall, $p_1$ and $p_2$ are the same since firewalls do not modify packets. Moreover, $p_1$ shall match an established connection or be allowed by security rules. States at network functions correspond to packet histories. According to examples of the present disclosure, the system may generically express the state constraint as recv$_p$→state$_s$, where p represents a sequence of packets required to establish state s. Such causality may also exist between one network function's output and another network function's input, which may be generically expressed as: send$_p$→recv$_p$.

It is also important to encode the causal precedence relationship to a format that can be accepted by a satisfiability modulo theories (SMT) solver. In general, SMT solvers solve a decision problem for logical formulas with respect to combinations of background theories expressed in classical first-order logic with equality. In some examples, the system may model packet behavior at network functions using two Boolean valued uninterpreted functions (e.g., the solver can assign any value to the function to a given input) with universal/existential quantifiers. For example, the example system may use the expression send(n,i,p,t) to indicate a send event of packet p by network function n through interface i at time t. Similarly, the example system may use the expression recv(n,i,p,t) to indicate a packet receive event of packet p by network function n through interface i at time t.

Thereafter, the example system may aggregate all interfaces of a network function into either the internal (i=0) or external (i=1) interface since some network functions may apply different processing policies for inbound and outbound packets. In some examples, the send or receive functions equal to true when variables are assigned with values corresponding to a valid event in the network. Otherwise, the send or receive functions will equal to false.

FIGS. 3A-3D show how to capture causal precedence relationships using example SMT encodings for some typical stateful network functions. Specifically, FIG. 3A illustrates an example stateful firewall 300. A stateful firewall 300 can utilize Access Control Lists (ACLs) to determine whether allow or deny a packet from a new connection. ACLs can be modeled using a clause acl_func($a_1$, $a_2$), where $a_1$ and $a_2$ correspond to the source and destination address of a packet. Packets that belong to established connections are allowed by a stateful firewall even if they are denied by ACLs. An established state indicates that the firewall has received and allowed a reverse packet before.

FIG. 3B illustrates an example load balancer 320. A load balancer 320 can hold a shared address (share_addr(a)) for a back-end server pool server_addr(a)). Requests sent to the load balancer are randomly distributed to one of the servers. Replies from servers look for a matched request and sent back by the load balancer.

FIG. 3C illustrates an example network address translator (NAT) 340. NAT 340 can either work as a source or a destination NAT. For outbound packets, a source NAT translates the private source IP to a public IP of the NAT, modeled using a clause pub_addr(a). If an inbound packet matches an established state, the source NAT translates its destination IP back to the private IP. A destination NAT maintains a one to one destination address mapping for connections initiated from outside networks and has a similar encoding as a load balancer.

FIG. 3D illustrates an example reverse proxy 360. A reverse proxy (also referred to as a "cache") 360 can be configured with ACLs specifying which clients have access to content originating at certain servers. Upon receiving a request that is allowed by ACLs, it initiate a new request to the corresponding server if the contents have not been cached. When receiving responses from the server, it forwards the response to the client who originally requested the content.

FIGS. 4A-4B illustrates an example two-stage verification of network functions in stateful intent-based networks. In this example, network function and network behavior use quantified logical formulas with discrete time steps. Combining with formulas describing invariants, a SMT solver can be used to check if the invariant can be satisfied. However, such encoding scheme may not scale for network function chains.

Therefore, to improve computational efficiency, the example system uses a two-stage verification approach, which firstly solve each network function separately and then combine the partial results from each network function to check if the end to end properties as intended by the policies can be satisfied.

Many network functions have concrete constraints on headers of incoming or outgoing packets. For example, a source NAT translates private addresses to its public addresses. Such concrete constraints are specified in network function configurations and can be propagated along a path, which helps to remove redundant information that the SMT solver might otherwise have to discover for itself.

State constraints may generally refer to the local packet processing history at a network function. To check if a state could be valid, only constraints within the network function are to be included.

As shown in FIG. 4A, the reachability from host $h_0$ 410 to $h_1$ 450 along path 400 can be represented as the combination of packet sending from each intermediate network function, including for example, a first firewall $FW_1$ 410, network address translator NAT 420, a second firewall $FW_2$ 430, and a load balancer LB 440.

FIG. 4B shows an example of two-stage verification for the path 400. The network functions along path 400 are decomposed into four parts, namely, a first firewall $FW_1$ 410, network address translator NAT 420, a second firewall $FW_2$ 430, and a load balancer LB 440. Each network function is verified separately at stage 1 460. Specifically, in stage 1, packet fields are resolved based on the network functions in the path 400. In each network function, the example system can check if there exist reachability.

Then, at stage 2 480, an arrow may indicate causal precedence relationship among two events. Based on the causal precedent relationship, the end-to-end reachability can be satisfied if there is no loop, which indicates there exists a valid time sequence for all packet sending and receiving to achieve the end-to-end reachability between host $h_0$ 410 and host $h_1$ 450. The example system can then combine all packet sending behavior, and check if there exist a possible sequence for the packet sending that satisfies the standard causality constraints, e.g., packets cannot be received before being sent.

This two-stage approach illustrated in FIGS. 4A-4B can efficiently verify network intents for stateful networks by encoding and thus improving performance. From the verification results, the example system can check any violation of the given network intent against the current network configurations. This approach can be applied to any kind of network devices because it has general packet field-based approaches. In addition, it can be applied to any intent-based management system.

Figure 5:
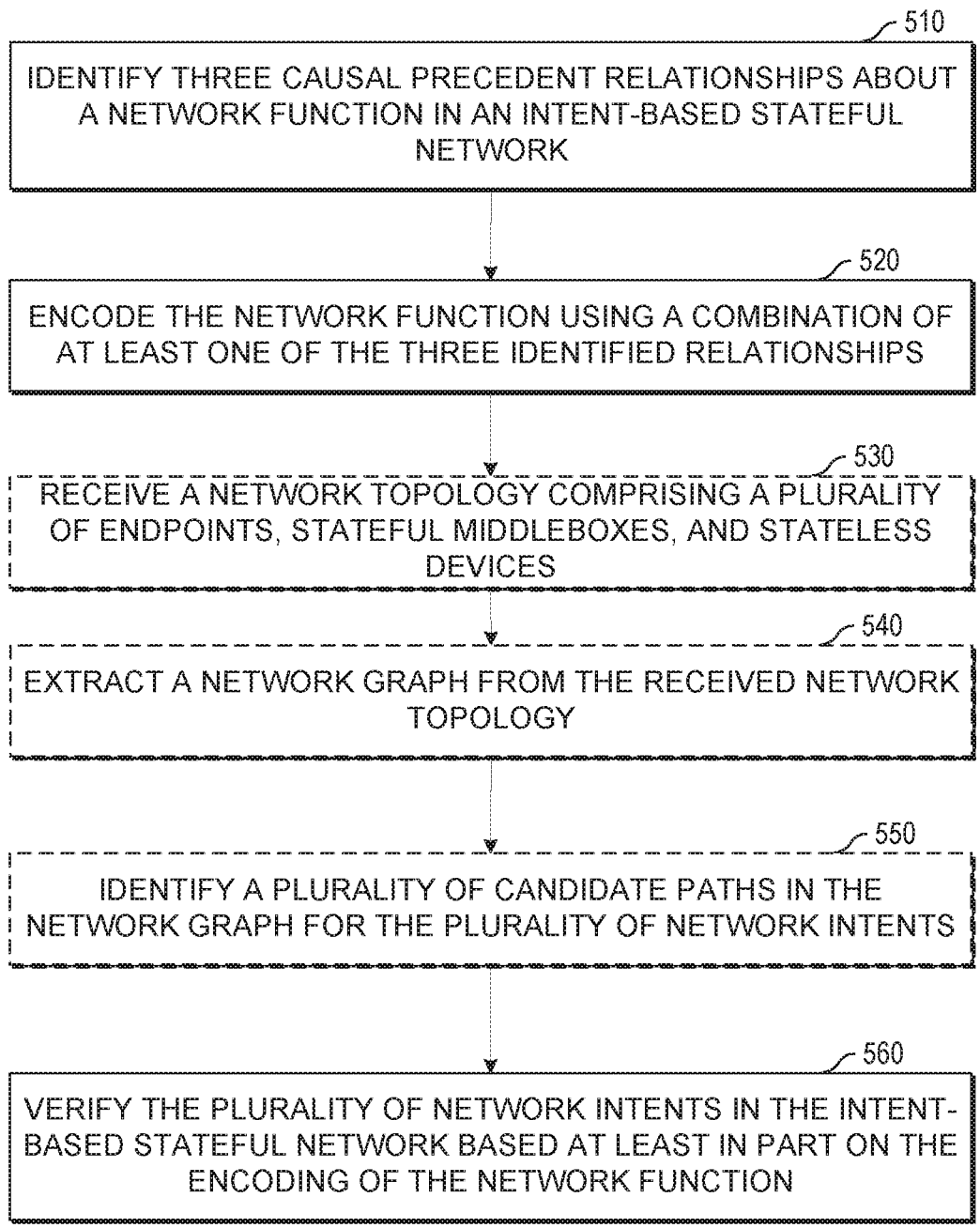
FIG. 5 is a flowchart of an example process of verifying network intent policies in an intent-based stateful network according to the present disclosure.

FIG. 5 is a flowchart of an example process of verifying network intent policies in an intent-based stateful network. During operations, a processor of a computing device may identify three causal precedent relationships about a network function in an intent-based stateful network (operation 510). Specifically, a first causal precedent relationship may indicate that the network function forwarding a network packet implies that at least one previous network packet was received by the network function in the same direction prior to the network packet is forwarded. A second causal precedent relationship may indicate that an established state in the network function implies that at least one previous network packet was received at the network function. A third causal precedent relationship indicates that the network function receiving the network packet as a downward network function implies the network packet was previously sent by a second network function acting as an upward network function.

Furthermore, the computing device may encode the network function using a combination of at least one of the three identified relationships (operation 520). In particular, the computing device may optionally receive a network topology comprising a plurality of endpoints, stateful middleboxes, and stateless devices (operation 530). Also, the computing device may optionally extract a network graph from the received network topology (operation 540). Next, the computing device may optionally identify a plurality of candidate paths in the network graph for the plurality of network intents (operation 550). Additionally, the computing device may verify a plurality of network intents in the intent-based stateful network based at least in part on the encoding of the network function. In some examples, the computing device may verify the plurality of network intent at least in part by determining whether at least one path between the at least two endpoints exists that satisfy the plurality of network intents.

In some examples, the computing device further removes the plurality of stateless devices from the received network topology, and determines a plurality of feasible paths of network packets between at least two endpoints in the intent-based stateful network.

In some examples, the computing device can determine a reachability between the at least two endpoints along each identified path. Then, the computing device can use the encoding of the network function to determine how the network function along the each identified path processes network packets. Next, the computing device can use a satisfiability modulo theories (SMT) solver to determine whether the at least one path between the at least two endpoints exists.

In some examples, the computing device can remove the plurality of stateless devices from the received network topology, and determine a plurality of feasible paths of network packets between at least two endpoints in the intent-based stateful network.

In some examples, the computing device can construct a model comprising a network graph and a plurality of encodings, wherein each encoding represents functionality of a particular type of network function acting as a middlebox. Here, the middlebox may include at least one of a stateful firewall, a network address translator, a load balancer, and a reverse proxy.

In some examples, the computing device may decompose the model and a preconfigured set of network policies into two stages for verification of intent-based stateful network. Specifically, the computing device may split a path into a plurality of sub-paths; verify reachability along each sub-path independently to produce a plurality of sub-path verification results; and combine the plurality of sub-path verification results at least based in part on states of the network function.

Figure 6:
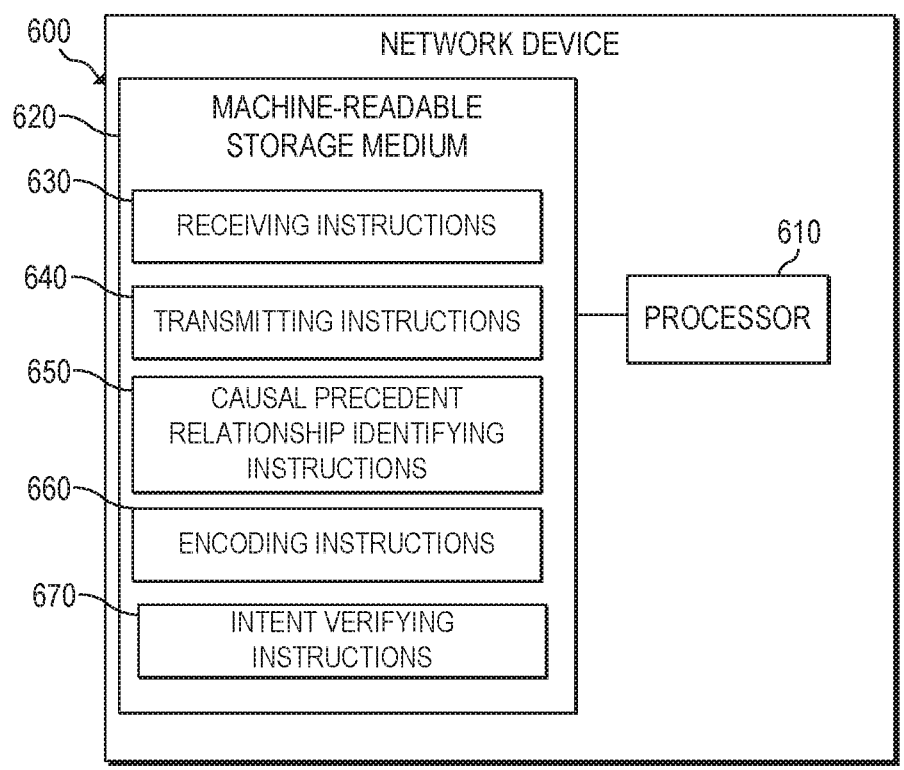
FIG. 6 is a block diagram of an example computing device to verify network intents in intent-based stateful networks according to the present disclosure.

FIG. 6 is a block diagram of an example computing device to verify network intents in intent-based stateful networks according to the present disclosure. As used herein, a computing device may be implemented, at least in part, by a combination of hardware and programming. For example, the hardware may comprise at least one processor (e.g., processor 610 which may include one main processor and a plurality of co-processors) and the programming may comprise instructions, executable by the processor(s), stored on at least one machine-readable storage medium (e.g., 620). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 610 may fetch, decode, and execute instructions stored on storage medium 620 to perform the functionalities described below in relation to receiving instructions 630, transmitting instructions 640, causal precedent relationship identifying instructions 650, encoding instructions 660, and intent verifying instructions 670. In other examples, the functionalities of any of the instructions of storage medium 620 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 6, storage medium 620 may be implemented by one machine-readable storage medium, or multiple machine-readable storage media.

Although computing device 600 includes at least one processor 610 and machine-readable storage medium 620, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 630-670 may be executed by processor 610 to: identify three causal precedent relationships about a network function in an intent-based stateful network; encode the network function using a combination of at least one of the three identified relationships; verify a plurality of network intents in the intent-based stateful network based at least in part on the encoding of the network function; receive a network topology comprising a plurality of endpoints, stateful middleboxes, and stateless devices; extract a network graph from the received network topology; remove the plurality of stateless devices from the received network topology; determine a plurality of feasible paths of network packets between at least two endpoints in the intent-based stateful network; identify a plurality of candidate paths in the network graph for the plurality of network intents; determine whether at least one path between the at least two endpoints exists that satisfy the plurality of network intents; determine a reachability between the at least two endpoints along each identified path; use the encoding of the network function to determine how the network function along the each identified path processes network packets; use a satisfiability modulo theories (SMT) solver to determine whether the at least one path between the at least two endpoints exists; construct a model comprising a network graph and a plurality of encodings, wherein each encoding represents functionality of a particular type of network function acting as a middlebox; decompose the model and a preconfigured set of network policies into two stages for verification of intent-based stateful network; split a path into a plurality of sub-paths; verify reachability along each sub-path independently to produce a plurality of sub-path verification results; combine the plurality of sub-path verification results at least based in part on states of the network function; etc.

We claim:
1. A method comprising:
   identifying, by a computing device, three causal precedent relationships about a network function in an intent-based stateful network,
   wherein a first causal precedent relationship indicates that the network function forwarding a network packet implies that at least one previous network packet was received by the network function in the same direction prior to the network packet is forwarded, wherein a second causal precedent relationship indicates that an established state in the network function implies that at least one previous network packet was received at the network function, wherein a third causal precedent relationship indicates that the network function receiving the network packet as a downward network function implies the network packet was previously sent by a second network function acting as an upward network function;

encoding, by the computing device, the network function using a combination of at least one of the three identified relationships; and verifying, by the computing device, a plurality of network intents in the intent-based stateful network based at least in part on the encoding of the network function.

2. The method of claim 1, further comprising:

receiving a network topology comprising a plurality of endpoints, stateful middleboxes, and stateless devices;

extracting a network graph from the received network topology.

3. The method of claim 2, wherein extracting the network graph further comprising:

removing the plurality of stateless devices from the received network topology;

determining a plurality of feasible paths of network packets between at least two endpoints in the intent-based stateful network.

4. The method of claim 2, wherein verifying the plurality of network intents further comprising:

identifying a plurality of candidate paths in the network graph for the plurality of network intents; and determining whether at least one path between the at least two endpoints exists that satisfy the plurality of network intents.

5. The method of claim 4, wherein determining whether the at least one path between the at least two endpoints exists further comprises:

determining a reachability between the at least two endpoints along each identified path;

using the encoding of the network function to determine how the network function along the each identified path processes network packets; and using a satisfiability modulo theories (SMT) solver to determine whether the at least one path between the at least two endpoints exists.

6. The method of claim 1, further comprising:

constructing a model comprising a network graph and a plurality of encodings, wherein each encoding represents functionality of a particular type of network function acting as a middlebox.

7. The method of claim 6, wherein the middlebox comprises at least one of a stateful firewall, a network address translator, a load balancer, and a reverse proxy.

8. The method of claim 6, further comprising:

decomposing the model and a preconfigured set of network policies into two stages for verification of intent-based stateful network.

9. The method of claim 8, wherein decomposing the model and the preconfigured set of network policies comprises:

splitting a path into a plurality of sub-paths;

verifying reachability along each sub-path independently to produce a plurality of sub-path verification results;

combining the plurality of sub-path verification results at least based in part on states of the network function.

10. A computing device comprising at least:

a memory;

a processor executing instructions in the memory to:

identify three causal precedent relationships about a network function in an intent-based stateful network, wherein a first causal precedent relationship indicates that the network function forwarding a network packet implies that at least one previous network packet was received by the network function in the same direction prior to the network packet is forwarded, wherein a second causal precedent relationship indicates that an established state in the network function implies that at least one previous network packet was received at the network function, wherein a third causal precedent relationship indicates that the network function receiving the network packet as a downward network function implies the network packet was previously sent by a second network function acting as an upward network function;

encode the network function using a combination of at least one of the three identified relationships; and verify a plurality of network intents in the intent-based stateful network based at least in part on the encoding of the network function.

11. The computing device of claim 10, wherein the processor further executes the instructions in the memory to:

receive a network topology comprising a plurality of endpoints, stateful middleboxes, and stateless devices;

extract a network graph from the received network topology.

12. The computing device of claim 11, wherein while extracting the network graph, the processor further executes the instructions in the memory to:

remove the plurality of stateless devices from the received network topology; and determine a plurality of feasible paths of network packets between at least two endpoints in the intent-based stateful network.

13. The computing device of claim 11, wherein while verifying the plurality of network intents, the processor further executes the instructions in the memory to:

identify a plurality of candidate paths in the network graph for the plurality of network intents; and determine whether at least one path between the at least two endpoints exists that satisfy the plurality of network intents.

14. The computing device of claim 13, wherein while determining whether the at least one path between the at least two endpoints exists, the processor further executes the instructions in the memory to:

determine a reachability between the at least two endpoints along each identified path;

use the encoding of the network function to determine how the network function along the each identified path processes network packets; and use a satisfiability modulo theories (SMT) solver to determine whether the at least one path between the at least two endpoints exists.

15. The computing device of claim 10, wherein the processor further executes the instructions in the memory to:

construct a model comprising a network graph and a plurality of encodings, wherein each encoding represents functionality of a particular type of network function acting as a middlebox.

16. The computing device of claim 15, wherein the middlebox comprises at least one of a stateful firewall, a network address translator, a load balancer, and a reverse proxy.

17. The computing device of claim 16, wherein the processor further executes the instructions in the memory to:
   decompose the model and a preconfigured set of network policies into two stages for verification of intent-based stateful network.

18. The computing device of claim 17, wherein while decomposing the model and the preconfigured set of network policies, the processor further executes the instructions in the memory to:
   split a path into a plurality of sub-paths;
   verify reachability along each sub-path independently to produce a plurality of sub-path verification results;
   combine the plurality of sub-path verification results at least based in part on states of the network function.

19. A non-transitory machine-readable storage medium encoded with instructions executable by a processor of a computing device, the non-transitory machine-readable storage medium comprising instructions to:
   identify three causal precedent relationships about a network function in an intent-based stateful network,
   wherein a first causal precedent relationship indicates that the network function forwarding a network packet implies that at least one previous network packet was received by the network function in the same direction prior to the network packet is forwarded,
   wherein a second causal precedent relationship indicates that an established state in the network function implies that at least one previous network packet was received at the network function,
   wherein a third causal precedent relationship indicates that the network function receiving the network packet as a downward network function implies the network packet was previously sent by a second network function acting as an upward network function;
   encode the network function using a combination of at least one of the three identified relationships; and
   verify a plurality of network intents in the intent-based stateful network based at least in part on the encoding of the network function.

20. The non-transitory machine-readable storage medium of claim 19, further comprising instructions to:
   receive a network topology comprising a plurality of endpoints, stateful middleboxes, and stateless devices;
   extract a network graph from the received network topology;
   identify a plurality of candidate paths in the network graph for the plurality of network intents; and
   determine whether at least one path between the at least two endpoints exist that satisfy the plurality of network intents.

* * * * *